S. LARSON.
HARROW AND DIGGER.
APPLICATION FILED APR. 26, 1909.
965,200.
Patented July 26, 1910.
6 SHEETS—SHEET 3.
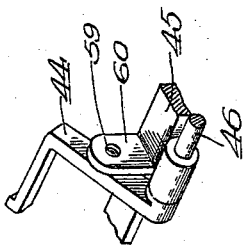
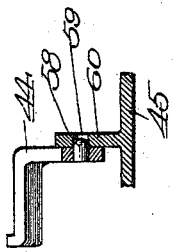
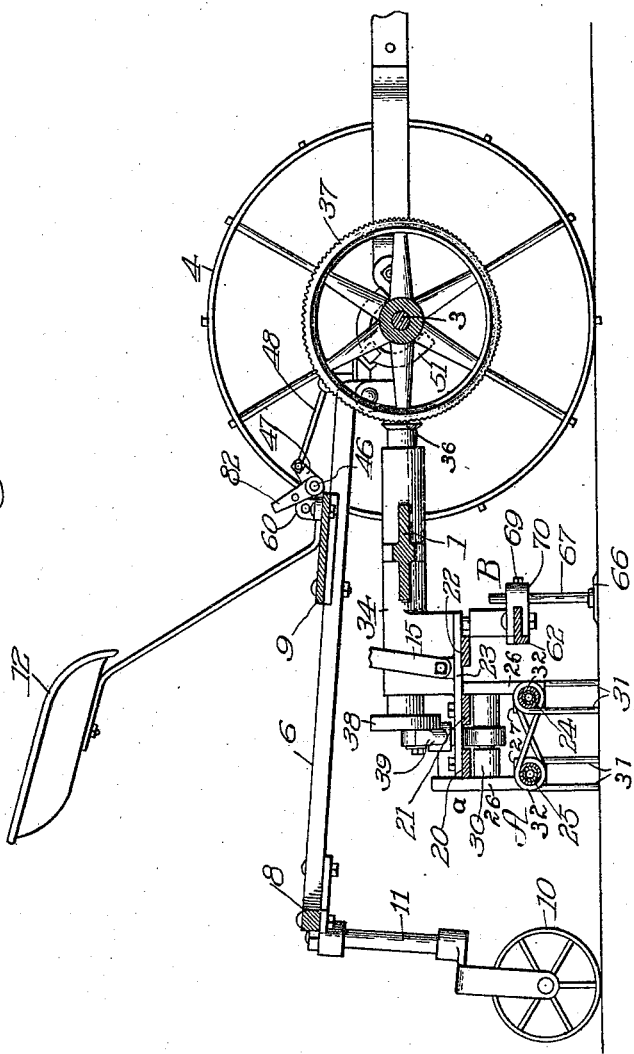
Witnesses:
Harold G Barrett
K. A. Costello
Inventor:
Samuel Larson
by M. E. Waldo,
Atty
THE NORRIS PETERS CO., WASHINGTON, D. C.

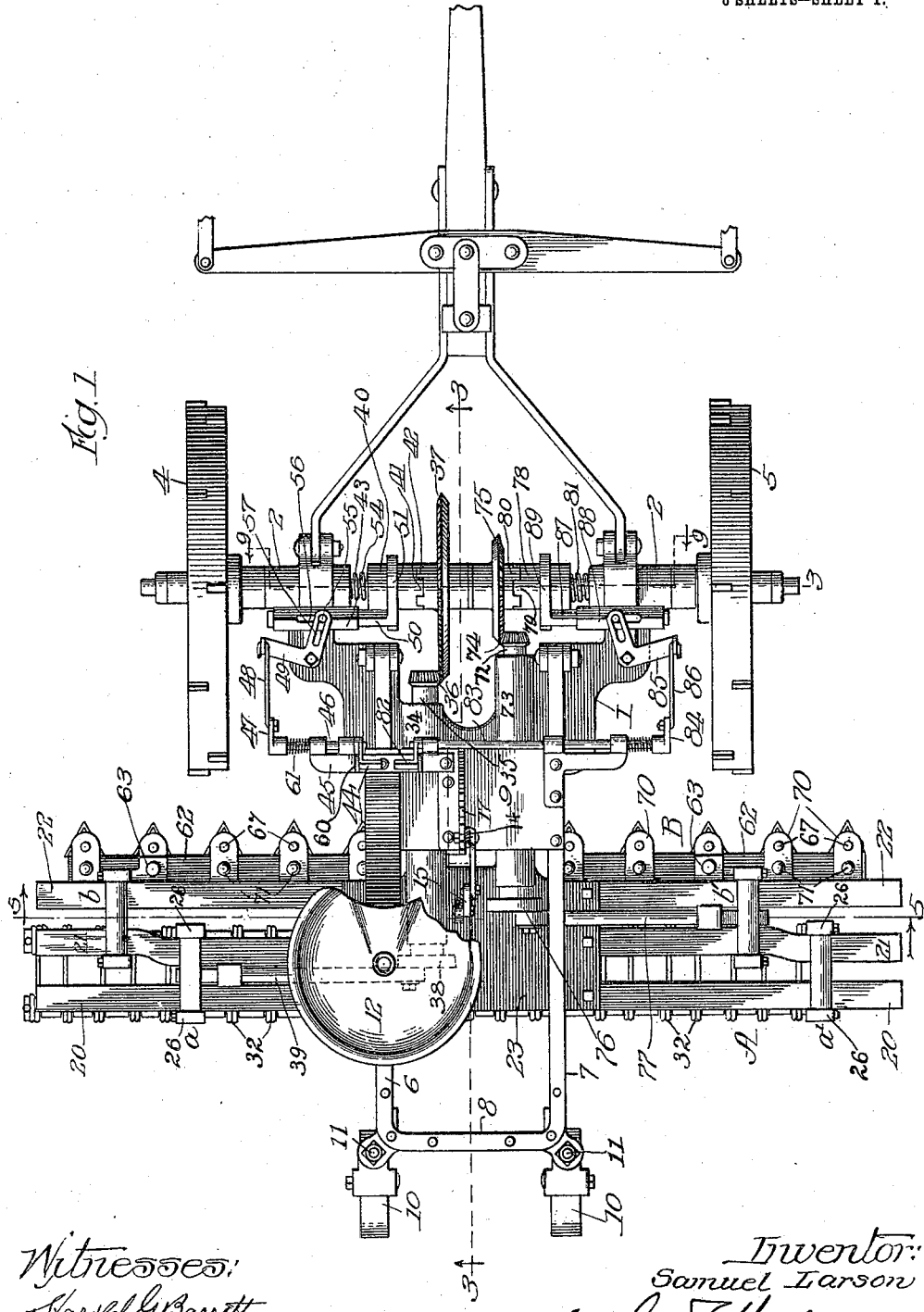

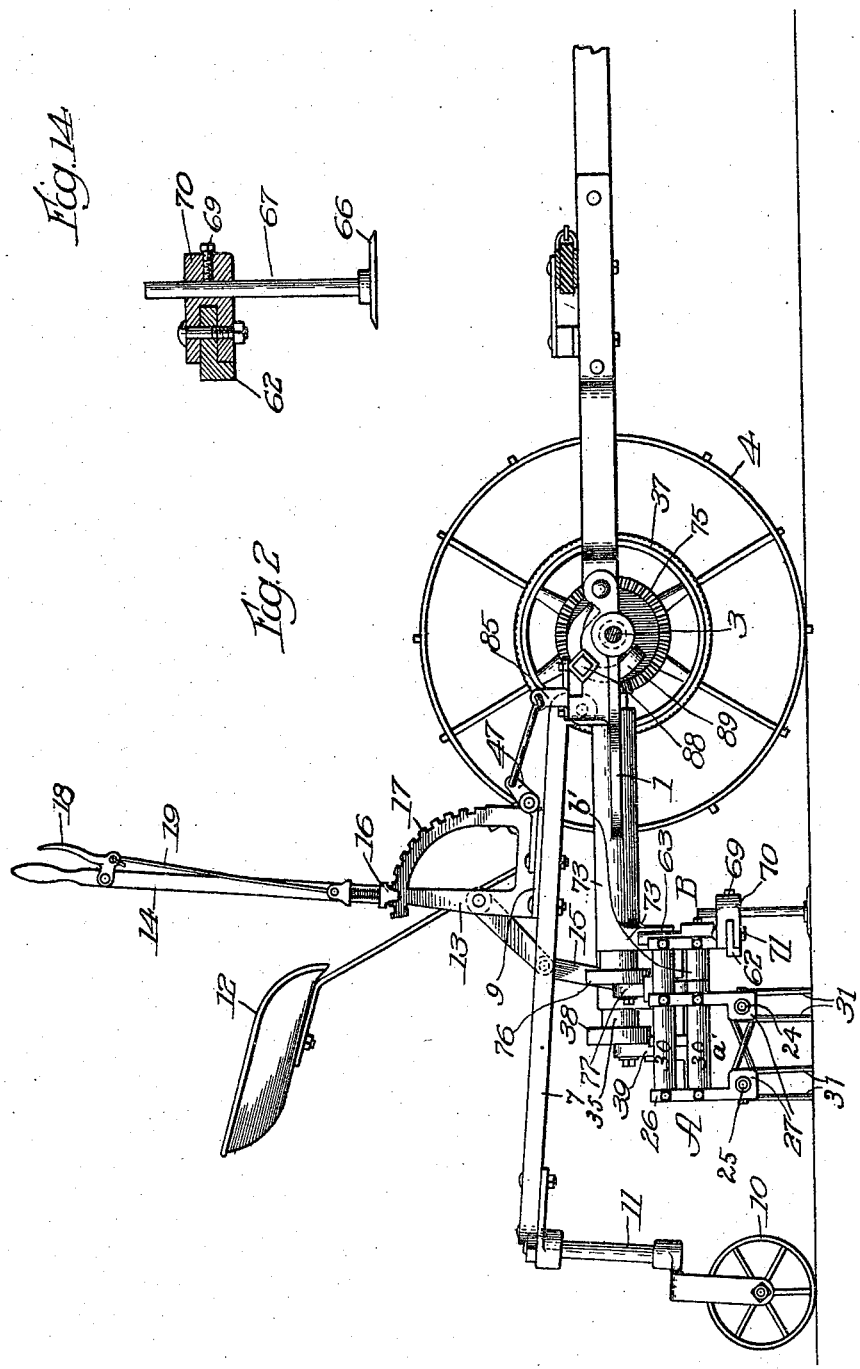

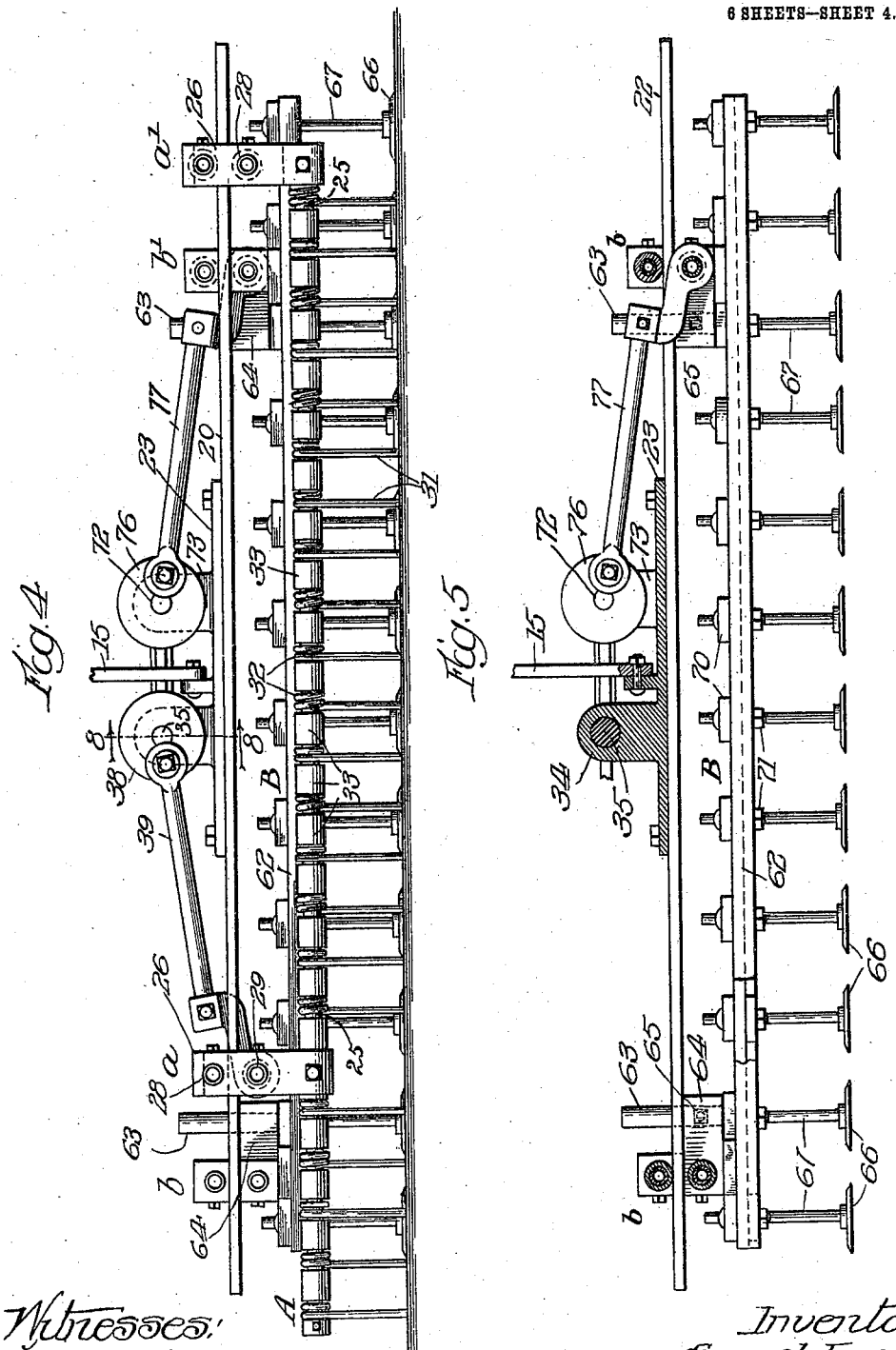

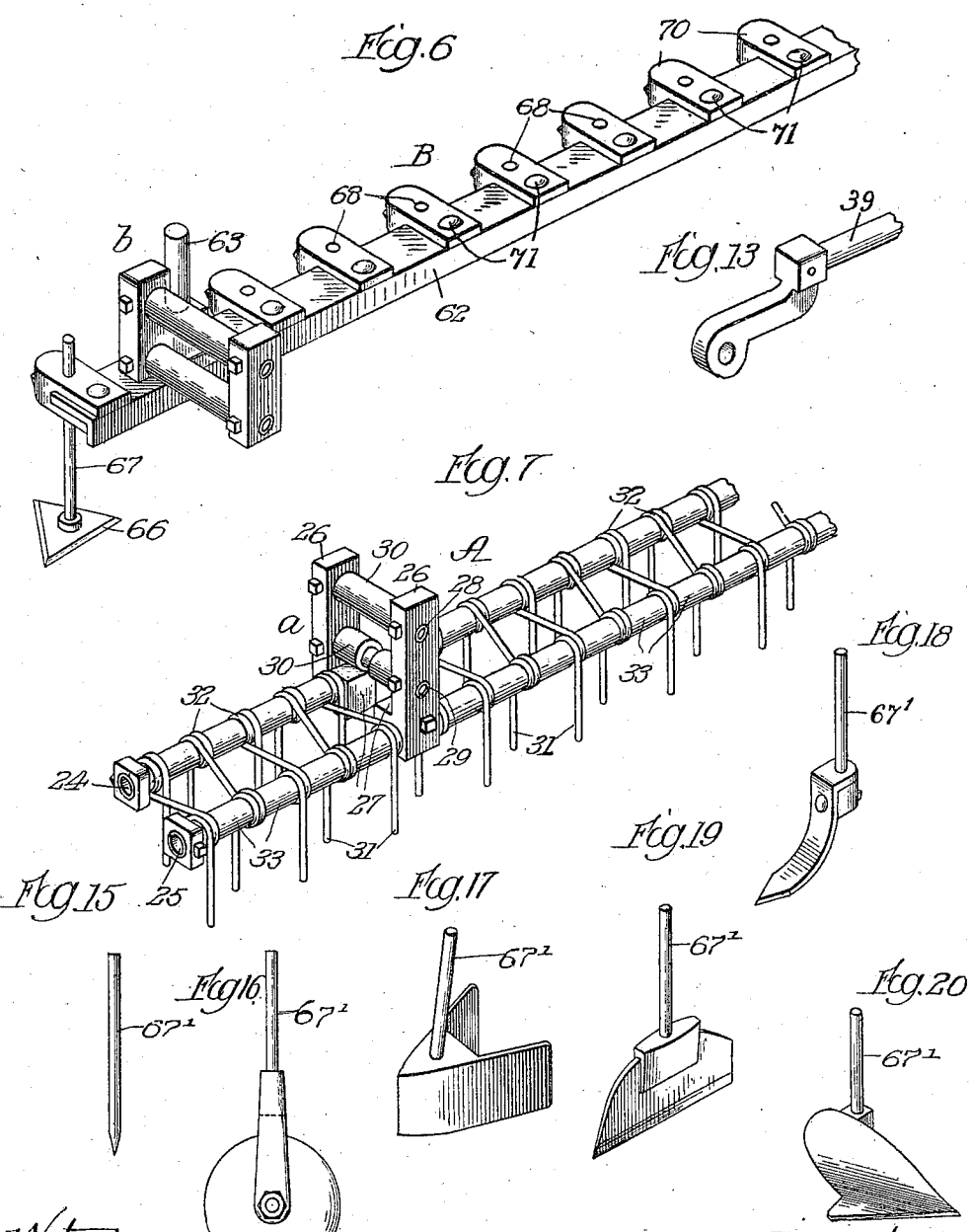

UNITED STATES PATENT OFFICE.

SAMUEL LARSON, OF HINSDALE, ILLINOIS.

HARROW AND DIGGER.

965,200.

Specification of Letters Patent. Patented July 26, 1910.

Application filed April 26, 1909. Serial No. 492,348.

*To all whom it may concern:*

Be it known that I, SAMUEL LARSON, a citizen of the United States, and a resident of Hinsdale, in the county of Dupage and State of Illinois, have invented certain new and useful Improvements in Harrows and Diggers, of which the following is a specification.

This invention relates to agricultural implements and relates particularly to the class of harrows and diggers.

A principal object of my invention is to provide a machine constructed and arranged and particularly adapted for pulverizing soil to prepare it for seeding and also to loosen the top layer of soil in order to retard evaporation from the underlying portions thereof.

A further object of my invention is to provide a machine of this character which, by simple changes and substitutions of implements, may be quickly and conveniently converted to adapt it for doing different kinds of work, as for making furrows for planting purposes; for cultivating; for tearing sod; breaking clods; exterminating weeds, and the like.

To this end a machine of my invention consists of the various features, combinations of features and details of construction hereinafter described and claimed.

Figure 8:
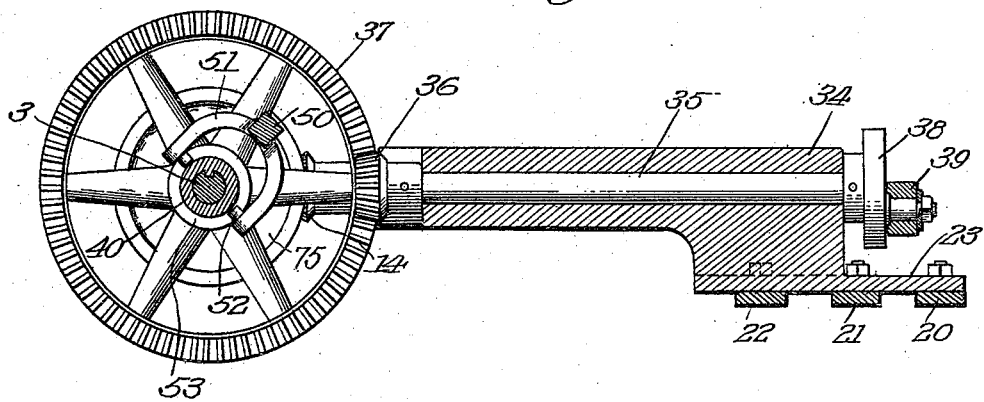
Figure 9:
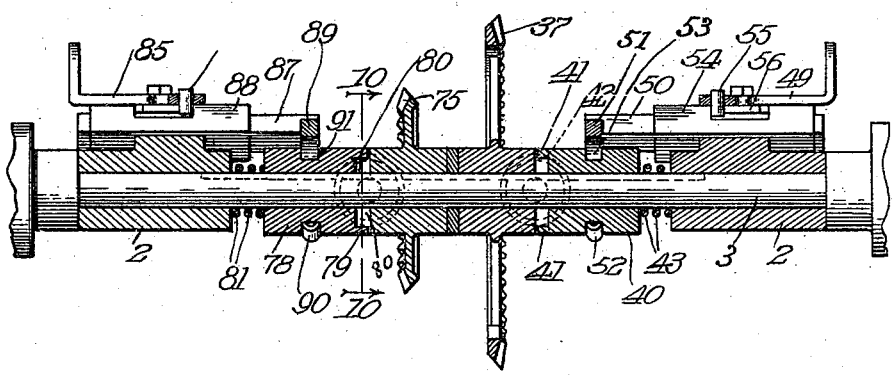
Figure 10:
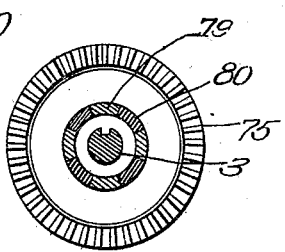

In the accompanying drawings, in which my invention is fully illustrated—Figure 1 is a top plan view of a machine embodying my invention. Fig. 2 is a side view thereof, the wheel of the machine on the side from which said view is taken, being removed. Fig. 3 is a sectional elevation on the line 3—3 of Fig. 1. Fig. 4 is a partial rear view of my improved machine showing the soil working instrumentalities on a slightly enlarged scale. Fig. 5 is a partial sectional elevation on the line 5—5 of Fig. 1. Fig. 6 is a perspective view on an enlarged scale, showing a portion of the front slide frame. Fig. 7 is a similar view showing part of the pulverizer slide frame. Fig. 8 is a partial sectional elevation on an enlarged scale taken substantially on the line 8—8 of Fig. 4, illustrating the means for reciprocating the pulverizer slide frame. Fig. 9 is a sectional elevation on an enlarged scale, taken substantially on the line 9—9 of Fig. 1, showing the driving gears and the clutches and levers for controlling the same. Fig. 10 is a transverse sectional elevation on the line 10—10 of Fig. 9, showing the construction of the clutches for connecting the driving gears to the driving shaft of the machine. Fig. 11 is a fragmentary, perspective view showing the construction of the foot levers for operating the clutches which control the driving gears. Fig. 12 is a vertical, sectional view of the parts shown in Fig. 11. Fig. 13 is a perspective view on an enlarged scale, of a head or member for connecting the pitman rods to the implement slide frames. Fig. 14 is a transverse, sectional view on an enlarged scale of the front slide frame, with a tool, as shown a hoe, secured in operative position therein. Figs. 15, 16, 17, 18, 19 and 20 illustrate different forms of tools adapted for use in my improved machine.

My improved machine is of the sulky type, comprising a suitable frame designated as a whole by 1, rotatably mounted in suitable bearings 2 in which is a shaft or axle 3, secured to rotate with which are combined supporting and traction wheels 4 and 5, whereby rotation of said wheels, as the machine is propelled, will operate to impart rotation to said shaft or axle 3.

The frame 1 is thus pivoted upon the shaft or axle 3 and its outer end is supported so that it may be raised and lowered in the following manner:—

Above the main frame 1 is a secondary frame consisting, as shown, of spaced frame members 6 and 7, the rear ends of which are rigidly connected by a transverse frame member 8 and which are connected adjacent to their forward ends by a platform 9.

The front ends of the lateral frame members 6 and 7 are pivotally connected to the frame 1 closely adjacent to the shaft or axle 3 and the rear end of said secondary frame is supported by means of caster wheels 10 mounted at the lower ends of rods or shanks 11, the various members of said secondary frame being proportioned to afford necessary clearance between the frame members 6 and 7 and the main frame 1 to provide for desired vertical adjustment of said main frame. While I have herein shown said frame members 6 and 7 as pivoted directly to the main frame 1, my invention contemplates, as an equivalent construction, pivoting them directly upon the shaft or axle 3, if desired.

A seat 12 is mounted on the secondary frame, preferably directly above the platform 9 and pivoted to a fixed part of said secondary frame, as shown to a standard 13 on the platform 9 in position for convenient operation by the operator sitting in the seat, is a hand lever 14, the lower end of which is pivotally connected by a link 15 with the rear end of the frame 1, the lower arm of said lever preferably extending at an angle to the upper arm, thus forming a bell-crank, so that the movement of the lower end of said lever will be substantially vertical. The hand lever 14 is adapted to be secured in different positions by means of a suitable spring catch 16 on said lever which is adapted to engage the teeth of a toothed segment 17 mounted substantially concentric with the axis of said lever. The catch 16 is adapted to be disengaged by means of a lever 18 mounted on the hand lever 14 in position to be conveniently grasped by the fingers of the operator in gripping the handle of the hand lever 14, said lever 18 being connected with the spring catch 16 by means of a rod or link 19, all in a familiar manner.

Formed at the rear end of the main frame 1 are suitable guides which extend transversely of the machine and on which are mounted to reciprocate slides or frames carrying different tools or implements. As shown, said transverse guides consist of bars 20, 21 and 22 rigidly secured, as by bolts or rivets, to a plate 23 at the rear end of the main frame 1, said plate being preferably formed integral with said main frame.

The implement slides or frames comprise a pulverizer frame indicated as a whole by A, and an implement slide or frame indicated as a whole by B, mounted in front of said pulverizer frame. As shown, the pulverizer slide or frame A consists of rods or bars 24 and 25 rigidly secured in substantially parallel position to heads $a$, $a^1$, said heads being provided with suitable bearings adapted to slidably engage corresponding bearing surfaces on the guide bars 20 and 21. The heads $a$, $a^1$ consist of upright side bars 26 formed on the lower ends of which are bosses 27, said bosses being provided with holes or openings in which the rods or bars 24 and 25 of the pulverizer frame are secured, as by set screws or the like. Above the bosses 27 the side bars 26 are connected by rods 28 and 29, the relation being such that a space will be formed between the upright side bars 26 and the rods 28 and 29 of proper size to receive and provide a bearing for the guide bars 20 and 21. The rods 28 and 29 are preferably made round and mounted thereon are sleeves or rollers 30, which will operate, in an obvious manner, to reduce friction between the heads $a$, $a^1$ and the guide bars 20 and 21.

Rigidly secured in or to the rods or bars 24 and 25 of the frame A, are teeth 31, preferably made of spring steel wire of suitable size, say, for ordinary purposes, about $\frac{5}{16}$ of an inch in diameter. While my invention contemplates securing said teeth 31 to the rods or bars 24 and 25 in any desired manner, in order to increase their resilience, I prefer the construction shown in the drawings, see particularly Figs. 3 and 7, in which said teeth are formed in pairs by the projecting ends of integral pieces of rod or wire bent between their ends to form coils 32 of proper size and properly spaced to permit the same to be inserted over the rods or bars 24 and 25.

In order to support the teeth 31 from tipping laterally as the pulverizer head A reciprocates, one of the coils 32 of each piece comprises two or more turns so as to form a bearing of sufficient length on one or the other of the rods 24 or 25 to form a stiff support for said teeth. Also, to increase the effectiveness of said teeth, they are preferably staggered. This can be effected in a simple manner by winding the coils 32 of adjacent teeth on each of the bars 24 and 25 in opposite directions, whereby alternate teeth will be located on opposite sides of said bars, respectively. Also, in order that the pieces of wire forming different pairs of teeth may all be wound in the same manner, thus rendering them similar in construction and interchangeable, the coils 32 on the pieces of wire forming different pairs of teeth are wound in different directions, the staggering of the teeth, as heretofore described, being effected by assembling adjacent pairs of teeth in reverse positions.

The teeth 31 are spaced apart transversely of the machine by means of short sleeves 33 inserted over the rods 24 and 25 between adjacent coils 32, said sleeves being preferably of such length that the teeth 31 will also be staggered in the direction in which the machine is designed to be propelled.

The coils 32 and thus the teeth 31 are secured on the bars 24 and 25 by means of sleeves or washers rigidly secured to said bars 24 and 25 outside of the extreme coils. In this manner it is possible to dispense with means for separately securing said coils and teeth to said bars. This construction also provides for conveniently replacing any of said teeth in case they become broken, the replacing of a tooth merely involving the removal of said end sleeves or washers and the removing of the teeth between the ends of said bars and the broken tooth, substituting a new pair of teeth for the broken tooth, replacing the teeth which were removed and again securing the sleeves or washers to the ends of said bars 24 and 25.

Reciprocating movement is adapted to be imparted to the pulverizer frame A, as the machine is propelled, in the following manner:—Rotatably mounted in a suitable longitudinal bearing 34 on the main frame 1 is a shaft 35 pinned or otherwise secured to the front end of which is a beveled pinion 36 which meshes with a beveled gear 37 mounted to rotate freely on the shaft or axle 3 of the machine. Secured to the rear end of said shaft 35 is a crank or disk 38, a crank pin secured in which is connected by a pitman 39 with a suitable pin rigidly secured in the frame A, as shown, to the rod 29 which connects the side bars 26 of the head a at the under side of the guide bars 20 and 21, said guide bars 20 and 21 being spaced apart to provide for thus connecting said pitman to said rod 29 at its center and the sleeve or roller 30 on said rod 29 comprising separate sections at opposite sides of the pitman bearing.

The bevel gear 37 is adapted to be connected to the shaft or axle 3 so as to rotate therewith by means of a clutch, consisting, as shown, of a sleeve 40 splined to the shaft or axle 3, formed in the end of which adjacent to said bevel gear 37 are clutch teeth 41 which are adapted to engage corresponding clutch teeth 42 on the hub of the bevel gear 37. The clutch teeth 41 are adapted to be maintained normally in engagement with the clutch teeth 42 by a spring 43 inserted between the end of said clutch sleeve and a shaft bearing 2 on the main frame 1. Movement lengthwise of the shaft or axle 3 is adapted to be imparted to the clutch sleeve 40 to effect disengagement of the clutch teeth 41 from the clutch teeth 42 by means of suitable connection between said clutch sleeve and a foot lever 44 mounted on the secondary frame of the machine in position to be conveniently operated by the foot of the operator sitting in the seat 12. As shown, the connections between said clutch sleeve 40 and foot lever 44 are as follows:—Mounted in suitable bearings in a bracket 45 is a shaft 46 to which said foot lever 44 is rigidly connected. A lever arm 47 is also secured to said shaft 46, the outer end of which is connected by a link 48 with one arm of a bell-crank lever 49 pivoted on the main frame 1 of the machine, the opposite arm of said bell-crank lever being connected to a slide 50 fitted to and longitudinally movable in a suitable bearing on the main frame 1 of the machine which extends substantially parallel with the shaft or axle 3 thereof. Formed on said slide 50 is a yoke 51, the arms of which embrace the clutch sleeve 40 and secured in which are pins 52 which engage a circumferential groove 53 formed in said clutch sleeve, the relation being such that depressing the foot lever 44 will operate through the described connections, to retract the clutch sleeve 40 against the force of the spring 43 to disengage the clutch teeth 41 on said clutch sleeve 40 from the clutch teeth 42 on the gear 37.

In the preferable construction shown, the slide 50 which carries the yoke 51 consists of a rod or bar and the bearing therefor is formed in a sleeve 54 secured in fixed position on the main frame 1 of the machine. The connection between the bell-crank lever 49 and the slide 50 consists of a pin 55 secured in said slide which projects through a slot 56 in the bearing sleeve 54 and engages a slot 57 in the bell-crank 49.

The clutch sleeve 40 is adapted to be secured in retracted position against the force of the spring 43 with the clutch teeth 41 thereon out of engagement with the clutch teeth 42 on the hub of the gear 37 by a suitable catch, consisting, as shown, of a pin 58 secured in the foot lever 44, the projecting end of which is adapted to engage a hole or opening 59 in a bracket 60 on the main frame of the machine. The shaft 46 is mounted so as to be movable lengthwise in its bearings and applied to said shaft is a spring adapted to impart movement thereto to effect engagement of the pin 58 projecting from the foot lever 44 with the hole or opening 59 in the bracket 60 and to maintain the same in engagement when thus engaged, while at the same time permitting endwise movement of said shaft to effect engagement and disengagement of said pin 58 from the hole or opening 59. As shown, engagement of said pin 58 with the hole 59 is adapted to be thus effected and maintained by a coiled spring 61 inserted between the bearing of the shaft 46 and the hub of the lever arm 47 secured thereto.

The implement slide or frame B consists of a bar 62 rigidly secured to heads $b$ $b^1$, which, as shown, are substantially identical with the heads $a$ $a^1$ of the pulverizer frame or slide A and which are provided with bearings similar to the bearings on said heads $a$ $a^1$ which engage corresponding bearing surfaces on the guide bars 21 and 22. As regards their general features, the construction of the heads $b$ $b^1$ will be readily understood from an inspection of the drawings, without a detailed description thereof.

To adapt the machine for using different kinds of implements on the implement slide or frame B and for varying the character of the work done by the machine, the bar 62 is preferably connected to the heads $b$ $b^1$ in such manner that it may be adjusted toward and from the ground. As shown, said bar 62 is supported to effect this object in the following manner:—Rigidly secured to said bar are upright studs 63 which engage holes or openings formed in bosses 64 on said heads $b$ $b^1$ and are adapted to be secured in desired vertical adjustment therein in any suitable manner, as by set screws 65.

The tools, as hoes 66, are secured on the bar 62, preferably in such manner that they may be conveniently removed therefrom and other tools substituted therefor. As shown, said tools are adapted to be secured on the bar 62 by means of shanks 67 thereon which are adapted to be secured in holes 68 in said bar 62 by means of set screws 69. As shown, the holes 68 instead of being formed directly in the bar 62, are formed in separate heads or clips 70 preferably removably secured to said bar 62, as by means of bolts 71, said heads or clips being provided with suitable shoulders which engage an edge of said bar and prevent said heads or clips from turning on said bar.

Reciprocating movement on the guide bars 21 and 22 is adapted to be imparted to the implement slide or frame B by means substantially identical with those heretofore described for imparting reciprocating movement to the pulverizer slide or frame A, said means comprising a shaft 72 rotatably mounted in a suitable bearing 73 on the main frame 1 of the machine, a beveled pinion 74 secured to the front end of said shaft 72 which meshes with a beveled gear 75 mounted to rotate freely on the shaft or axle 3, a crank or disk 76 secured to the rear end of the shaft 72, a crank pin in which is connected by a pitman 77 with the rod which connects the upright lateral members of the head $b^1$ at the under side of the guide bars 21 and 22. The beveled gear 75 is adapted to be secured to and released from the shaft or axle 3 by means of a suitable clutch comprising a clutch sleeve 78 splined to said shaft or axle formed in the end of which adjacent to said beveled gear are clutch teeth 79 which are adapted to engage corresponding clutch teeth 80 on the hub of said gear 75. The clutch teeth 79 on the clutch sleeve 78 are adapted to be maintained normally in engagement with the clutch teeth 80 on the bevel gear 75 by a spring 81 inserted between the rear end of said clutch sleeve and a bearing 2 for the shaft or axle 3. Movement is adapted to be imparted to the clutch sleeve 78 to effect disengagement of the clutch teeth 79 from the clutch teeth 80 by suitable means comprising a foot lever 82 secured to a shaft 83 rotatably mounted in suitable bearings in a bracket on the platform 9, a lever arm 84 secured to said shaft 83, a bell-crank lever 85 pivoted on the main frame of the machine, one arm of which is connected to the lever arm 84 by a link 86 and the other arm to a slide 87 movable lengthwise in a suitable guide bearing 88 in a direction substantially parallel with the shaft or axle 3. A yoke 89 on the slide 87 embraces the clutch sleeve 78 and secured therein are pins 90 which engage a circumferential groove 91 in the clutch sleeve, all in a manner substantially identical with the corresponding means for controlling the clutch sleeve 40 applied to the beveled gear 37 by means of which reciprocating movement is imparted to the pulverizer slide or frame A.

The controlling mechanism for the clutch sleeve 78 also preferably comprises means for securing the same in position with the clutch teeth 79 and 80 disengaged. As shown, said means are substantially identical with those heretofore described for thus securing the clutch sleeve 40 in retracted position with the clutch teeth 41 and 42 disengaged, and will be readily understood from an inspection of the drawings without a detailed description thereof.

To render the mechanism more compact, I provide only three guide bars 20, 21 and 22, the middle bar 21 being utilized to support and provide bearings for all of the heads $a$ $a^1$ and $b$ $b^1$, said guide bar 21 comprising offset sections, as shown, to bring the portions thereof coöperating with the bars 20 and 22, respectively, to form the guide bearings for said heads in proper positions relative thereto. If for any reason desired, however, my invention contemplates, as an equivalent construction, forming the guide bearings for the different heads $a$ $a^1$ and $b$ $b^1$ on entirely separate and distinct guide bars.

In Figs. 15 to 20, inclusive, of the drawings, I have shown several different forms of tools or implements adapted for use on my improved machine and which may be readily substituted for the hoes 66 shown in connection with the drawings of the machine, all of said tools being provided with shanks $67^1$ adapted to be secured in the holes in the heads or clips 70, thus providing for conveniently substituting them for said hoes 66. The tools or implements shown in said Figs. 15 to 20, and their functions may be briefly described as follows:—Fig. 15 shows a pointed tooth particularly designed and adapted for tearing sod; Fig. 16 shows a disk harrow; Fig. 17 shows a tool for forming furrows for planting purposes; Fig. 18 shows a cultivator; Fig. 19 a hilling-up tool or implement; and Fig. 20 a plow for doing light or shallow plowing. When using the hoe 66 and the sod tearing tool shown in Fig. 15, the bevel gear 75 will preferably be operatively connected to the driving shaft or axle 3, whereby, as the machine is propelled, reciprocating movement will be imparted to the implement frame or head B.

When using the tools shown in Figs. 16 to 20, however, said driving gear 75 will be disengaged from the shaft or axle 3, thus providing for movement of said tools in a straight line.

While the usual operation of my machine contemplates continuous reciprocation of the pulverizer frame A, provision is made for disengaging the same from the driving shaft or axle 3 so as to convert its operation into that of an ordinary fixed tooth harrow.

While I have herein shown and described my improved machine as comprising both the pulverizer frame or slide A and the implement frame or slide B, my invention contemplates the omission of either thereof, such omission, however, being accompanied with a corresponding loss of function. Moreover, with a machine of the construction shown and described, it is obvious that either the pulverizer frame A or the implement frame B may be quickly disconnected and detached, leaving only the other thereof and for many kinds of work, as when using the tools or implements shown in Figs. 17, 18 and 19, the pulverizer frame A will ordinarily be thus disengaged and detached, as the action of the pulverizer teeth will interfere with the designed operation of the tools shown in said Figs. 17, 18 and 19.

The throw of the cranks which impart reciprocating movement to the slide frames A and B, will preferably be slightly greater than the distance between adjacent tools or implements on said slide frames, so that the paths of travel of said tools or implements will overlap, thus insuring all of the ground being worked over.

The sizes of the beveled gears 37 and 75 and of the pinions 36 and 74 which respectively engage said gears, are proportioned to impart a desired number of reciprocations or strokes to the slide frames A and B for each revolution of the wheels 4 and 5. A desirable size for the wheels 4 and 5 for ordinary purposes is about two feet in diameter, and with this size of wheel a desirable relation for the driving gears and pinions is such that the slide frame A will make approximately six strokes for each revolution of the wheels 4 and 5 and the slide frame B about two strokes, said slide frame A thus making about three strokes for each stroke of the slide frame B. Obviously, this relation may be varied as desired to meet different conditions and requirements.

Horses or the like will ordinarily be used for propelling my improved machine, said machine being provided with a suitable tongue for hitching the horses thereto.

I claim:—

1. In a machine of the type described, the combination of a frame, an axle rotatably mounted in bearings on said frame, combined supporting and traction wheels secured to rotate with said axle, transverse guides on said frame, slide frames mounted to reciprocate on said transverse guides, soil working implements of different character secured in said slide frames respectively, and driving connections between said slide frames and the axle of the machine, substantially as described.

2. In a machine of the type described, the combination of a frame, an axle rotatably mounted in bearings on said frame, combined supporting and traction wheels secured to rotate with said axle, transverse guides on said frame, slide frames mounted to reciprocate on said transverse guides, soil working implements of different character secured in said slide frames respectively, driving connections between said slide frames and the axle of the machine and independent means for engaging and disengaging the driving connections between said axle and said slide frames, respectively, substantially as described.

3. In a machine of the type described, the combination of a frame, an axle rotatably mounted in bearings on said frame, combined supporting and traction wheels secured to rotate with said axle, transverse guides on said frame, slide frames mounted to reciprocate on said transverse guides, soil working implements of different character secured in said slide frames, respectively, comprising harrow teeth on the rear slide frame, driving connections between said slide frames and the axle of the machine, and independent means for engaging and disengaging the driving connections between said axle and said slide frames, respectively, substantially as described.

4. In a machine of the type described, the combination with a frame, an axle rotatably mounted in bearings on said frame, combined supporting and traction wheels secured to rotate with said axle, transverse guides on said frame, slide frames mounted to reciprocate on said transverse guides, soil working implements of different character secured in said slide frames, respectively, and driving connections between said slide frames and the axle of the machine, the relation being such that said slide frames will be operated at different rates of speed, substantially as described.

5. In a machine of the type described, the combination with a frame, an axle rotatably mounted in bearings on said frame, combined supporting and traction wheels secured to rotate with said axle, transverse guides on said frame, slide frames mounted to reciprocate on transverse guides, soil working implements of different character secured in said slide frames, respectively, driving connections between said slide frames and the axle of the machine, the relation being such that said slide frames will be operated at different rates of speed, and independent means for engaging and disengaging the driving connections between said axle and said slide frames, respectively, substantially as described.

6. In a machine of the type described, the combination of a frame, an axle rotatably mounted in bearings on said frame, combined supporting and traction wheels secured to rotate with said axle, transverse guides on said frame, slide frames mounted to reciprocate on said transverse guides, soil working implements of different character secured in said slide frames respectively, the implements in one thereof being secured thereto so as to be separately removable thus providing for substituting different kinds of implements for those in the machine at any time and thereby adapting the machine for doing work of different kinds, and driving connections between said slide frames and the axle of the machine, substantially as described.

7. In a machine of the type described, the combination of transverse guide bars and slide frames mounted to reciprocate on said guide bars, said slide frames comprising heads and implement supporting means secured to said heads, said heads comprising upright lateral members which embrace lateral edges of said guide bars, and transverse members which connect said upright members of said head above and below said guide bars and which embrace the upper and lower sides thereof, substantially as described.

8. In a machine of the type described, the combination of transverse guide bars and slide frames mounted to reciprocate on said guide bars, said slide frames comprising heads and implement supporting means secured to said heads, said heads comprising upright lateral members which embrace lateral edges of said guide bars, round transverse members which connect said upright members of said head above and below said guide bars, and rollers rotatably mounted on said transverse members, the relation being such that said rollers will closely embrace the upper and lower sides of said transverse guide bars, substantially as described.

9. A slide frame for a machine of the type described comprising heads, spaced rods secured to said heads, and harrow teeth formed by the depending ends of pieces of wire bent to form coils inserted over said rods, substantially as described.

10. A slide frame for a machine of the type described comprising heads, spaced rods secured to said heads, and harrow teeth formed by the depending ends of pieces of wire bent to form coils inserted over said rods or bars and comprising coils wound in opposite directions, substantially as described.

11. A slide frame for a machine of the type described comprising heads, spaced rods secured to said heads, and harrow teeth formed in pairs by the depending ends of integral pieces of wire bent between their ends to form coils inserted over different rods, substantially as described.

12. A slide frame for a machine of the type described comprising heads, spaced rods secured to said heads, and harrow teeth formed by the depending ends of integral pieces of wire bent between their ends to form coils inserted over different rods, the coils formed in each of said separate pieces of wire being bent in opposite directions and adjacent pairs of teeth being inserted over said rods or bars in reversed positions, substantially as described.

In testimony, that I claim the foregoing as my invention, I affix my signature in presence of two subscribing witnesses, this 23rd day of April, 1909.

SAMUEL LARSON.

Witnesses:
K. A. COSTELLO,
G. M. ELLINGEN.